H. H. JONES.
BELT CLAMP.
APPLICATION FILED JULY 29, 1910.
1,006,224.
Patented Oct. 17, 1911.
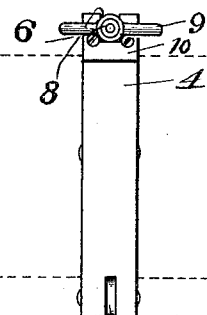
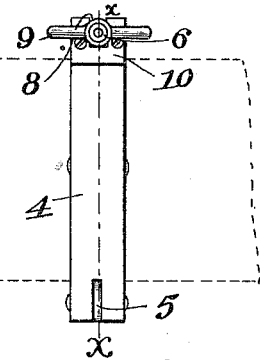
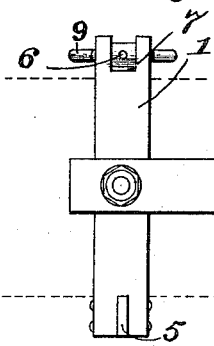
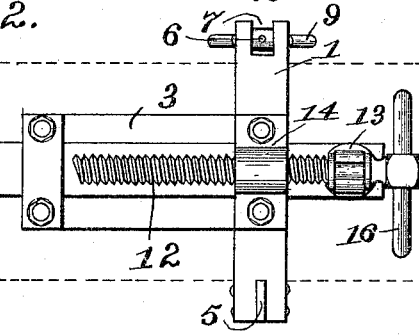
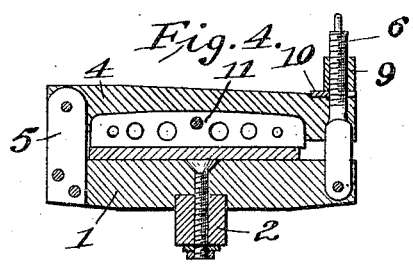
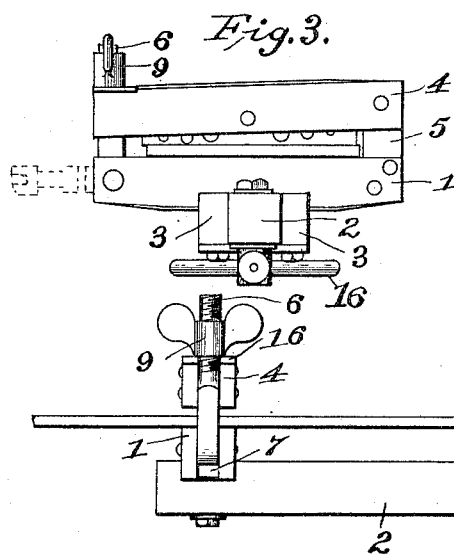
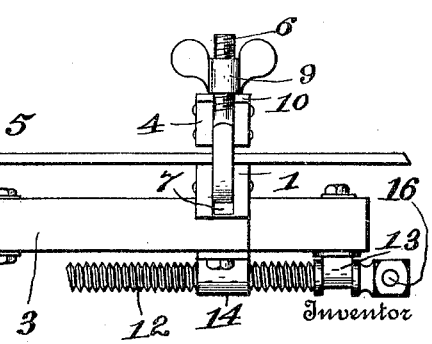
Witnesses
C. E. Tepfer.
M. E. Shook.
Inventor
Harry Herbert Jones
By Edson Bros
Attorneys

UNITED STATES PATENT OFFICE.

HARRY HERBERT JONES, OF LANCASTER, NEW HAMPSHIRE.

BELT-CLAMP.

1,006,224.  Specification of Letters Patent.  Patented Oct. 17, 1911.

Application filed July 29, 1910. Serial No. 574,567.

*To all whom it may concern:*

Be it known that I, HARRY HERBERT JONES, a citizen of the United States, residing at Lancaster, in the county of Coos and State of New Hampshire, have invented certain new and useful Improvements in Belt-Clamps; and I do hereby declare the following to be a full, clear, and exact description of the invention, such as will enable others skilled in the art to which it appertains to make and use the same.

My invention relates to belt clamps designed for "putting on" and "taking up" machine belts.

The object of this invention is to provide a belt clamp which is simple in construction, inexpensive to manufacture, effective in operation, and adapted more especially to small belts which are ordinarily removed from the pulleys when it becomes necessary to shorten or "take up" said belts. My clamp is so designed that a belt can be quickly "taken up" or shortened without removing it from the pulleys. The tension of the belt can be more accurately determined, and more properly adjusted when the belt is strained upon and over the pulleys.

The invention consists in the features of construction and combinations of parts hereinafter described and specified in the claims.

In the accompanying drawing illustrating the preferred embodiment of my invention: Figure 1 is a top plan view of the belt clamp, a portion of the belt being shown in dotted lines. Fig. 2 is an under plan view. Fig. 3 is an end view showing the belt in solid lines. Fig. 4 is a sectional view on the line x—x of Fig. 1 but showing the belt in solid lines, and Fig. 5 is a side view of the whole device.

Each of the belt clamps comprises a lower portion or jaw 1, rigidly secured to one of the telescoping parts 2 and 3, and an upper jaw 4 hinged to the lower jaw at one end by a link 5 which is itself rigidly fastened to the lower jaw. The free ends of said jaws are connected by a screw 6 made square in cross section, pivotally connected in a slot 7 in said lower jaw and having its upper portion engaged with a corresponding slot 8 in the upper jaw. Said bolt is equipped with a thumb nut 9 whereby the two jaws may be clamped firmly together. A metal wear plate 10 is preferably placed below the thumb nut on the upper jaw. It will be understood that when the thumb nut is loosened, its bolt may be swung outwardly, as illustrated in dotted lines in Fig. 3, whereupon the upper jaw may be raised for placing a belt in the clamp.

The upper jaw of each clamp is provided with an equalizing bar 11 intermediately pivoted thereto and projecting from its lower face. This bar is capable of moving on its pivot in a vertical plane in either direction. When the clamp is tightened upon a belt, this bar automatically adjusts itself to the thickness of the belt, and to any unevenness in its thickness, distributing the pressure of the clamp equally upon and across the belt.

To the under face of the member or bar 2, there is attached a longitudinally extending screw 12 by means of a collar 13 which holds said screw against longitudinal movement with respect to said bar 2. The other telescoping member or guiding part 3 carries a bracket 14 having a screw-threaded passage arranged in alinement with the collar 13 on the other member. The screw 12 engages said screw-threaded opening whereby the turning of the screw, by means of the handle 16 thereof, will move the parts 2 and 3 longitudinally with respect to one another and cause the belt clamps to move toward or away from each other in accordance with the direction in which said screw is turned.

I am aware that changes may be made in the details of construction which I have herein shown and described without departing from the spirit or sacrificing the advantages of my invention. I, therefore, reserve the right to make such changes as fairly fall within the scope of the appended claims.

I claim:

1. The combination, with two clamps, each having an automatically operated equalizing bar and adapted to grip a belt of the character described, of means to move said clamps with respect to one another for the purpose specified.

2. The combination, with two clamps adapted to grip a belt of the character described, each clamp comprising a lower jaw and an upper jaw pivoted together at one end and having an adjustable connection at the other end, one of the jaws of each clamp having an automatically operated equalizing bar, of means to move said clamps with respect to one another for the purpose specified.

3. The combination, with two clamps adapted to grip a belt of the character described, of two telescoping parts, one secured to each of said clamps, and a screw arranged longitudinally of said telescoping parts and connected thereto whereby they and said clamps may be advanced or retracted.

4. The combination, with two clamps adapted to grip a belt of the character described, said clamps having equalizing bars, of two telescoping parts, one secured transversely to each of said clamps, and a screw arranged longitudinally of said telescoping parts and connected thereto whereby they and said clamps may be advanced or retracted.

In testimony whereof, I affix my signature, in presence of two witnesses.

HARRY HERBERT JONES.

Witnesses:
W. H. McCarter,
Enos G. Fay.

---

Copies of this patent may be obtained for five cents each, by addressing the "Commissioner of Patents, Washington, D. C."